(12) United States Patent
Hamasaki

(10) Patent No.: US 12,307,609 B2
(45) Date of Patent: May 20, 2025

(54) INFORMATION PROCESSING APPARATUS AND INFORMATION PROCESSING METHOD

(71) Applicant: SONY GROUP CORPORATION, Tokyo (JP)

(72) Inventor: Takumi Hamasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/002,552

(22) PCT Filed: Jun. 22, 2021

(86) PCT No.: PCT/JP2021/023550
§ 371 (c)(1),
(2) Date: Dec. 20, 2022

(87) PCT Pub. No.: WO2022/004483
PCT Pub. Date: Jan. 6, 2022

(65) Prior Publication Data
US 2024/0290042 A1    Aug. 29, 2024

(30) Foreign Application Priority Data
Jun. 29, 2020   (JP) .................. 2020-111294

(51) Int. Cl.
G06T 19/00       (2011.01)
(52) U.S. Cl.
CPC .................. *G06T 19/006* (2013.01)

(58) Field of Classification Search
None
See application file for complete search history.

(56) References Cited

U.S. PATENT DOCUMENTS

| 9,619,105 | B1 * | 4/2017 | Dal Mutto | G06F 3/04815 |
| 10,930,075 | B2 * | 2/2021 | Costa | G06F 3/017 |
| 11,106,949 | B2 * | 8/2021 | Zia | G06N 3/08 |

(Continued)

FOREIGN PATENT DOCUMENTS

JP    2017-120550 A    7/2017

OTHER PUBLICATIONS

International Search Report and Written Opinion of PCT Application No. PCT/JP2021/023550, issued on Sep. 21, 2021, 09 pages of ISRWO.

*Primary Examiner* — Martin Mushambo
(74) *Attorney, Agent, or Firm* — CHIP LAW GROUP

(57) ABSTRACT

[Object] To provide a technology of preventing delay of AR display of a virtual object.
[Solving Means] An information processing apparatus according to the present technology includes a control unit. The control unit performs a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal, and AR-displays, when the target object enters the angle-of-view of AR display, a virtual object with respect to the target object on the basis of the previously recognized position and attitude of the target object.

20 Claims, 11 Drawing Sheets

(56) References Cited

U.S. PATENT DOCUMENTS

| | | | |
|---|---|---|---|
| 11,112,838 B2* | 9/2021 | Sung | G09F 9/301 |
| 11,284,109 B2* | 3/2022 | Hinds | H04N 19/132 |
| 11,480,787 B2* | 10/2022 | Ishikawa | H04N 23/6812 |
| 2017/0161957 A1* | 6/2017 | Yajima | G06V 20/20 |
| 2017/0168585 A1* | 6/2017 | Faaborg | G06F 3/147 |
| 2017/0289444 A1* | 10/2017 | Han | H04N 23/667 |
| 2017/0316607 A1* | 11/2017 | Khalid | G02B 27/017 |
| 2018/0101986 A1* | 4/2018 | Burns | G06T 19/006 |
| 2018/0288423 A1* | 10/2018 | Vembar | H04N 19/124 |
| 2020/0074743 A1* | 3/2020 | Zheng | G01P 13/00 |
| 2020/0279110 A1* | 9/2020 | Omata | G06F 3/011 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/023550 filed on Jun. 22, 2021, which claims priority benefit of Japanese Patent Application No. JP 2020-111294 filed in the Japan Patent Office on Jun. 29, 2020. Each of the above-referenced applications is hereby incorporated herein by reference in its entirety.

TECHNICAL FIELD

The present technology relates to a technology for augmented reality (AR)-displaying a virtual object.

BACKGROUND ART

In recent years, there has been widely known an AR technology in which a virtual object is superimposed and displayed on target objects existing in the real world so that a user can perceive the virtual object as if the virtual object was an object existing in the real world (e.g., see Patent Literature 1 below).

The AR technology is installed in a variety of terminals such as a head-mounted display (HMD) and a smartphone, for example.

In order to AR-display a virtual object with respect to a target object, it is necessary to recognize position and attitude of the target object with respect to the terminal. This recognition technology has been studied and developed so far, and one of main methods can be a method of recognizing the position and attitude of the target object from image information from an imaging unit provided in the terminal.

CITATION LIST

Patent Literature

Patent Literature 1: Japanese Patent Application Laid-open No. 2017-120550

DISCLOSURE OF INVENTION

Technical Problem

When the terminal changes in attitude, for example, when the user wearing the HMD turns the head, the target object can enter an angle-of-view of AR display. In such a case, the virtual object is not AR-displayed until the position and attitude of the target object are recognized, and the AR display is delayed.

In view of the above-mentioned circumstances, it is an object of the present technology to provide a technology of preventing delay of AR display of a virtual object.

Solution to Problem

An information processing apparatus according to the present technology includes a control unit.

The control unit performs a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal, and AR-displays, when the target object enters the angle-of-view of AR display, a virtual object with respect to the target object on the basis of the previously recognized position and attitude of the target object.

Accordingly, it is possible to prevent delay of AR display of a virtual object.

An information processing method according to the present technology includes:
performing a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal; and
AR-displaying, when the target object enters the angle-of-view of AR display, a virtual object with respect to the target object on the basis of the previously recognized position and attitude of the target object.

A program according to the present technology causes a computer to execute processing including:
performing a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal; and
AR-displaying, when the target object enters the angle-of-view of AR display, a virtual object with respect to the target object on the basis of the previously recognized position and attitude of the target object.

MODE(S) FOR CARRYING OUT THE INVENTION

Hereinafter, embodiments according to the present technology will be described with reference to the drawings.

First Embodiment

<Overall Configuration and Configurations of Respective Units>

Figure 1:
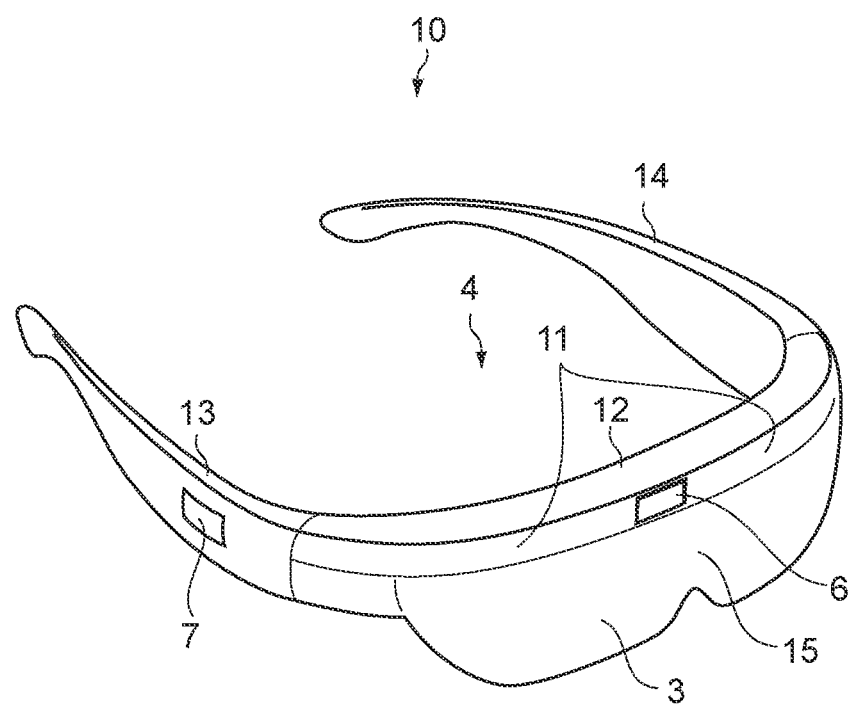
FIG. 1 A diagram showing an example of an HMD according to a first embodiment of the present technology.
Figure 2:
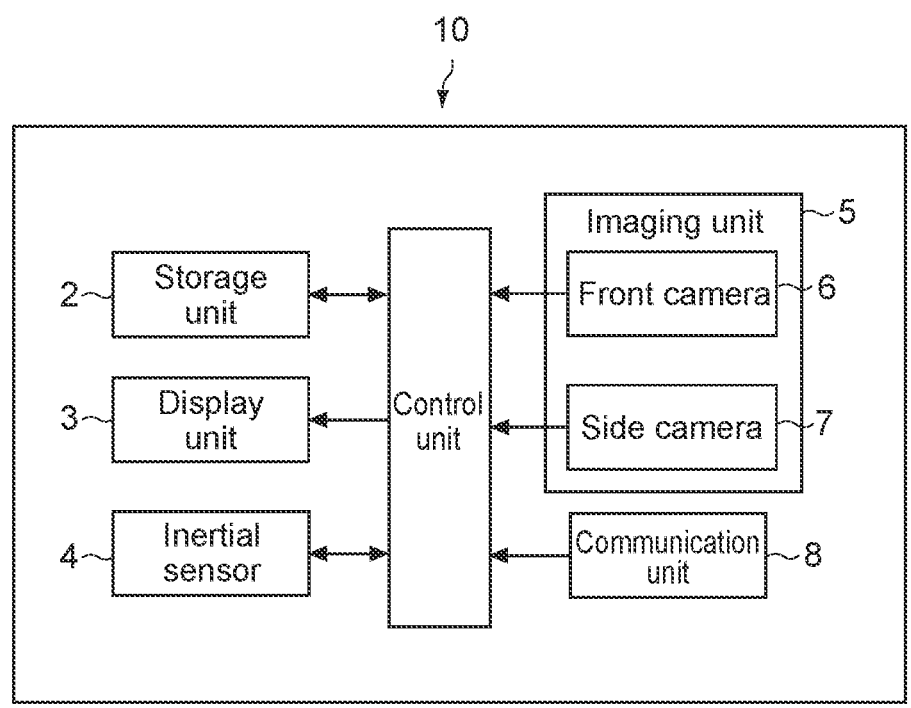
FIG. 2 A block diagram showing an internal configuration of the HMD according to the present embodiment.

FIG. 1 is a diagram showing an HMD 10 according to a first embodiment of the present technology. FIG. 2 is a block diagram showing internal configurations of the HMD 10 according to the present embodiment.

As shown in FIGS. 1 and 2, the HMD 10 (an example of a terminal) includes an HMD body 11, a control unit 1, a storage unit 2, a display unit 3, an inertial sensor 4, imaging units 5, and a communication unit 8.

The HMD body 11 is mounted on a user's head for the use. The HMD body 11 includes a front portion 12, a right temple portion 13 provided on the right side of the front portion 12, a left temple portion 14 provided on the left side of the front portion 12, and a glass portion 15 attached on the lower side of the front portion 12.

Under the control of the control unit 1, the display unit 3 is capable of AR-displaying a virtual object 9 in an angle-of-view of AR display on the front side. The AR display means performing display to enable the user to perceive as if the virtual object 9 was a real object existing in the real space.

Figure 3:
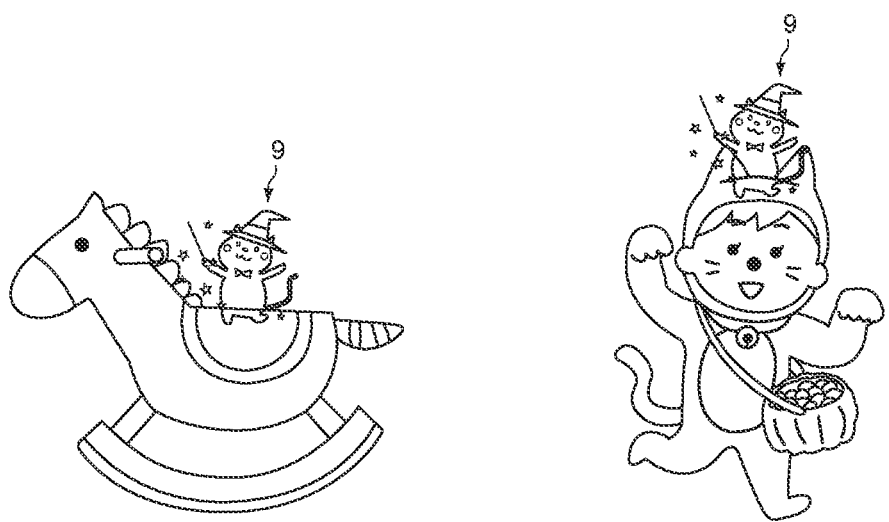
FIG. 3 A diagram showing a status when a virtual object is superimposed and AR-displayed on a target object.

FIG. 3 is a diagram showing a status when the virtual object 9 is superimposed and AR-displayed on a target object. On the left-hand side of FIG. 3, a status when a virtual object 9 that is a character is AR-displayed at a position on a saddle of a rocking horse that is a target object is shown. On the right-hand side of FIG. 3, a status when the virtual object 9 that is the character is AR-displayed at a position on the face of a person (child) who is a target object is shown.

At least a part of the display unit 3 is provided in the glass portion 15. The display unit 3 is a light-transmissive display portion (optical see-through display), and for example, includes an organic light emitting diode (OLED) and a light guiding plate as a light source. The display unit 3 can employ a variety of aspects such as a configuration using a half mirror and a retinal imaging display. The light source of the display unit 3 may be provided in the front portion 12, the right temple portion 13, the left temple portion 14, or the like.

It should be noted that the display unit 3 may be a video see-through display. In this case, an image in which the virtual object 9 is superimposed on an image captured by a front camera 6 provided on the front side is displayed on the display unit 3.

The imaging units 5 include the front camera 6 (second imaging unit) and a side camera 7 (first imaging unit). The front camera 6 and the side camera 7 each include an imaging element such as a charge coupled device (CCD) sensor and a complemented metal oxide semiconductor (CMOS) sensor and an optical system such as an imaging lens.

In the example shown in FIG. 1, the front camera 6 (second imaging unit) is provided outward in an outer surface of the front portion 12. The front camera 6 acquires a front image (second image information) in the front of the HMD 10 and outputs the front image (second image information) to the control unit 1.

The front camera 6 is an example of the second imaging unit. The second imaging unit is configured to be capable of imaging a region corresponding to the angle-of-view of AR display of the display unit 3. The second imaging unit images an object present in the region corresponding to the angle-of-view of AR display and outputs the captured image information (second image information) to the control unit 1.

In the example shown in FIG. 1, the side camera 7 is provided outward in an outer surface of the right temple portion 13. The side camera 7 acquires a side image (first image information) on the right side of the HMD 10 and outputs the side image (first image information) to the control unit 1.

The side camera 7 is an example of the first imaging unit. The first imaging unit is configured to be capable of imaging a region outside the angle-of-view of AR display of the display unit 3. The first imaging unit images an object present outside the angle-of-view of AR display and outputs the captured image information (first image information) to the control unit 1.

It should be noted that examples of the position at which the first imaging unit is provided can include a side of the HMD 10, a middle position between the side and the front, the back, a middle position between the back and the side, and a position above the head. Typically, it is sufficient that the first imaging unit is disposed at a position capable of imaging an area in a direction which it is difficult for the second imaging unit to image because of its angle-of-view.

Moreover, although the example in the case where the number of first imaging units is one is shown in the example shown in FIG. 1, two or more first imaging units may be provided. It should be noted that since a significantly large number of first imaging units increases the power consumption of the HMD 10, the number of first imaging units is set considering this point.

The inertial sensor 4 includes an accelerometer that detects acceleration in three axial directions and a gyroscope that detects angular velocity around the three axes. The inertial sensor 4 outputs to the control unit 1 the detected acceleration in the three axial directions and the detected angular velocity around the three axes as inertial information.

Although the detection axis of the inertial sensor 4 is set to the three axes in the present embodiment, the detection axis may be a single axis or two axes. Moreover, although two types of sensors are used as the inertial sensor 4 in the present embodiment, one or three types of sensors may be used as the inertial sensor 4.

The communication unit 8 is configured to be capable of communicating with an external apparatus (e.g., a server apparatus in a network) with a wire or wirelessly.

The control unit 1 performs various arithmetic operations on the basis of various programs stored in the storage unit 2 and comprehensively controls the respective units of the HMD 10. It should be noted that processes of the control unit 1 will be described later in detail in the section of "Operation Description".

The control unit 1 is realized by hardware or a combination of hardware and software. The hardware configured as a part of the control unit 1 or the entire control unit 1. Examples of this hardware can include a central processing unit (CPU), a graphics processing unit (GPU), a vision processing unit (VPU), a digital signal processor (DSP), a field programmable gate array (FPGA), an application specific integrated circuit (ASIC), and a combination of two or more of them.

The storage unit 2 includes a nonvolatile memory for storing various programs and various types of data required for processes of the control unit 1 and a volatile memory used for a working region of the control unit 1. It should be noted that the various programs may be read from a portable storage medium such as an optical disc and a semiconductor memory or may be downloaded from the server device in the network.

<Operation Description>

Next, processes of the control unit 1 of the HMD 10 will be described.

[Localization Process]

Figure 4:
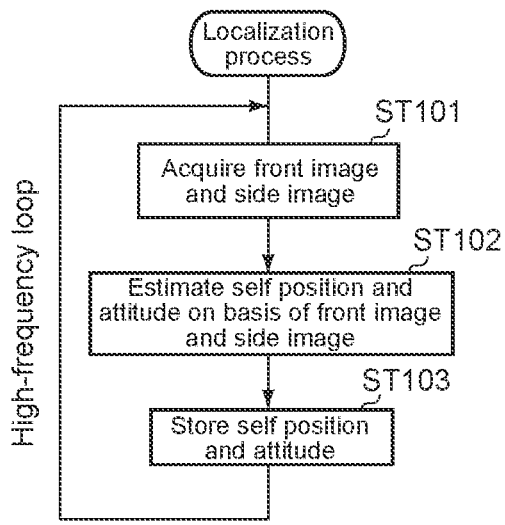
FIG. 4 A flowchart showing a localization process of a control unit.

First of all, a localization process of the control unit 1 will be described. FIG. 4 is a flowchart showing the localization process of the control unit 1. First of all, the control unit 1 acquires a front image from the front camera 6 and acquires a side image from the side camera 7 (Step 101).

Next, the control unit 1 estimates self position and attitude of the terminal in a world coordinate system on the basis of the front image and the side image (Step 102). Then, the control unit 1 causes the storage unit 2 to store the estimated self position and attitude in association with time information (Step 103), and then returns to Step 101.

Hereinabove, the case where both the front image and the side image are used for the localization has been described. However, either one of the front image and the side image may be used for the localization.

In the localization, for example, a group of feature points extracted from image information (front image and/or side image) is compared to a group of feature points included in map information, and the localization of the HMD 10 is performed.

There are a method of previously generating the map information used for the localization and a method of generating the map information used for the localization at the same time as the localization without previously generating it, and either one of the methods may be used. It should be noted that the method of generating the map information at the same time as the localization is generally called simultaneous localization and mapping (SLAM).

The localization includes relocalization and motion tracking. The relocalization is a technology of performing the localization in the world coordinate system on the basis of a group of feature points of the image information and a group of feature points of the map information.

This relocalization is performed for example immediately after the HMD 10 powered on or when the localization based on the motion tracking fails. Moreover, the process of comparing the group of feature points from the image information with the group of feature points included in the map information may be constantly performed, and the relocalization may be performed in a case where matching of these groups of feature points is successful.

The motion tracking is a technology of calculating, on the basis of the image information (or the inertial information), an amount of change (motion) of the self position and attitude for each minute time and sequentially adding this amount of change, thereby performing the current localization in the world coordinate system.

In the motion tracking, first of all, the image information is subjected to image processing and a group of feature points is extracted from the image information. Then, an amount of change between previous self position and attitude and the current self position and attitude is calculated by comparing a group of feature points of previous image information with a group of feature points of the current image information. By adding this amount of change to the previous self position and attitude, the current localization is performed in the world coordinate system.

Hereinabove, the case where the image information from the imaging units 5 is used for the motion tracking has been described. However, inertial information from the inertial sensor 4 may be used instead of the image information. Alternatively, both the image information and the inertial information may be used.

Moreover, in the localization, the self position and attitude estimated on the basis of the image information may be corrected on the basis of the inertial information.

It should be noted that although various methods have been proposed for the localization technology in the current state, typically a terminal apparatus 20 may perform the localization process by any method.

Here, a loop of the localization process shown in FIG. 4 is a high-frequency loop (e.g., 100 to 200 times/second).

[Recognition Process of Position and Attitude of Target Object with Respect to HMD 10]

Next, a recognition (estimation) process of relative position and attitude of the target object with respect to the HMD 10 will be described. In the present embodiment, the control unit 1 performs a recognition process of estimating and recognizing the position and attitude of the target object inside the angle-of-view of AR display with respect to the HMD 10 on the basis of the front image (hereinafter, position-and-attitude recognition process of the target object based on the front image).

Moreover, the control unit 1 performs a previous recognition process of previously estimating and recognizing the position and attitude of the target object outside the angle-of-view of AR display with respect to the HMD 10 on the basis of the side image for a case where a target object present outside the angle-of-view of AR display enters the angle-of-view of AR display (hereinafter, previous position-and-attitude recognition process of the target object based on the side image).

Moreover, in the present embodiment, there are a detection process (detection) and a tracking process (tracking) for the position-and-attitude recognition process of the target object based on the front image and the previous position-and-attitude recognition process of the target object based on the side image, respectively.

That is, in the present embodiment, for the recognition process of the relative position and attitude of the target object with respect to the HMD 10, the following four processes (1) to (4) are performed.

1. Target object position-and-attitude recognition process based on the front image
    (1) Detection process of the target object in the front image (second detection process)
    (2) Tracking process of the target object in the front image (second tracking process)
2. Target object previous position-and-attitude recognition process based on the side image
    (3) Detection process of the target object in the side image (first detection process)
    (4) Tracking process of the target object in the side image (first tracking process)

Here, the detection process is a technology of estimating and recognizing position and attitude of the target object with respect to the HMD 10 from a single image without prior information related to the target object. In this detection process, whether the target object is in the image (whether the target object has been detected) is determined. Then, in a case where the target object is in the image, the relative position and attitude of the target object with respect to the HMD 10 are estimated.

On the other hand, the tracking process is a technology of estimating and recognizing the position and attitude of the target object with respect to the HMD 10 in a situation where the previous position and attitude of the target object with respect to the HMD 10 have been provided in advance as the prior information. In this tracking process, after the target object is detected by the detection process, a motion of the target object is tracked and position and attitude of the target object with respect to the HMD 10 are estimated on the basis of the prior information.

"Detection Process in Front Image"

Figure 5:
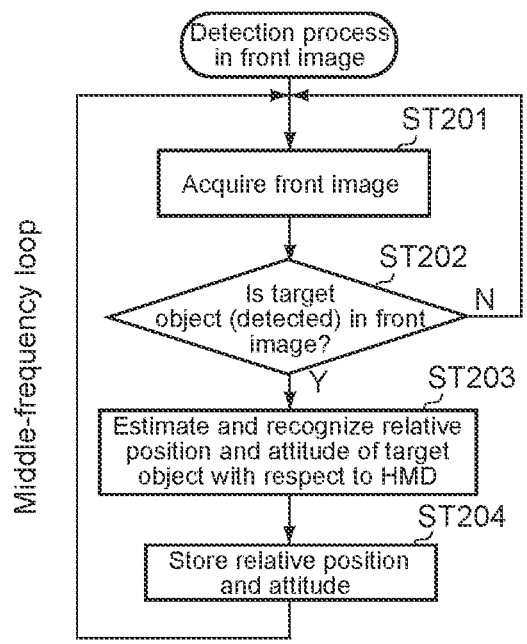
FIG. 5 A flowchart showing a detection process of a target object in a front image.

First of all, the detection process of the target object in the front image (second detection process) will be described. FIG. 5 is a flowchart showing the detection process of the target object in the front image.

First of all, the control unit 1 acquires a front image from the front camera 6 (Step 201). Next, the control unit 1 determines whether a target object that is an AR display target for the virtual object 9 is in the front image (whether the target object has been detected) (Step 202).

The target object may be an AR marker or the like prepared in advance in the real world for example (marker type AR) or may be an object existing in the real world, such as the rocking horse and person as shown in FIG. 3 (markerless type AR).

For the determination as to whether the target object is in the front image, first of all, the control unit 1 extracts a group of feature points from the front image. Next, the control unit 1 compares the group of feature points extracted from the front image with a group of feature points of a cognitive model that is a target object (stored in the storage unit 2 in advance), thereby determining whether the target object is in the front image.

In a case where the target object is not in the front image (in a case where the target object has not been detected) (NO in Step 202), the control unit 1 returns to Step 201 and acquires a front image from the front camera 6 again. On the other hand, in a case where the target object is in the front image (YES in Step 202), the control unit 1 estimates and recognizes relative position and attitude of the target object with respect to the HMD 10 on the basis of the group of feature points corresponding to the target object in the front image (Step 203).

Next, the control unit 1 stores the relative position and attitude of the target object with respect to the HMD 10 in the storage unit 2 in association with the time information (Step 204) and returns to Step 201.

It should be noted that the detection process in the front image shown in FIG. 5 is typically repeatedly performed also after one target object is detected. It is because a plurality of target objects is present in the front image in some cases. On the other hand, in a case where only one virtual object 9 is AR-displayed, when the one target object has been detected, the detection process shown in FIG. 5 may be stopped while this target object can be tracked (see Step 304 in FIG. 6).

"Tracking Process in Front Image"

Figure 6:
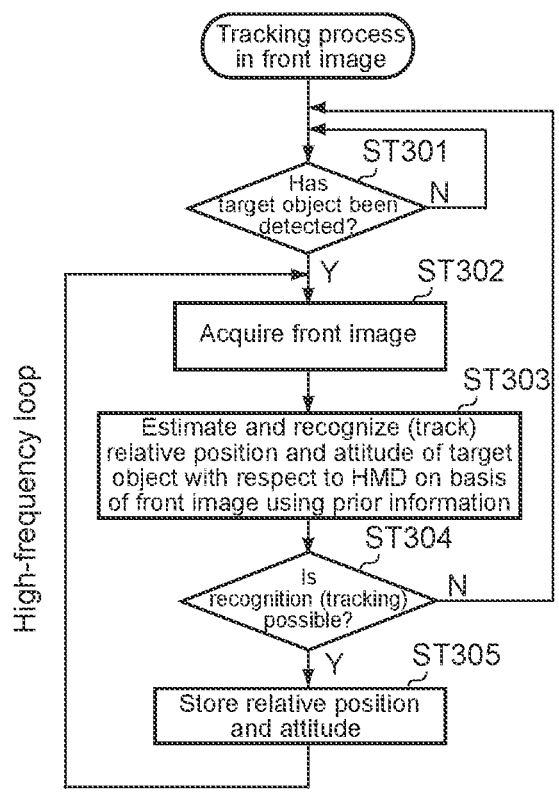
FIG. 6 A flowchart showing a tracking process of the target object in the front image.

Next, the tracking process of the target object in the front image (second tracking process) will be described. FIG. 6 is a flowchart showing the tracking process of the target object in the front image.

First of all, in the detection process of the target object in the front image, the control unit 1 determines whether the target object has been detected (Step 301) (see Step 202 in FIG. 5). In a case where the target object has not been detected (NO in Step 301), the control unit 1 returns to Step 301.

On the other hand, in a case where the target object has been detected (YES in Step 301), the control unit 1 acquires a front image from the front camera 6 (Step 302). Next, using the previous position and attitude (prior information) of the target object with respect to the HMD 10, the control unit 1 estimates and recognizes relative position and attitude of the target object with respect to the HMD 10 on the basis of the group of feature points corresponding to the target object in the front image (Step 303).

Next, the control unit 1 determines whether the position and attitude of the target object were able to be recognized (whether the target object was able to be tracked) (Step 304). In a case where the position and attitude of the target object were not able to be recognized (the target object was not able to be tracked) (NO in Step 304), the control unit 1 returns to Step 301.

It should be noted that examples of the case where the position and attitude of the target object were not able to be recognized can include the following cases (1) and (2). (1) The target object departs from the angle-of-view of the front camera 6 and the target object is not shown anymore in the front image. (2) Although the target object is in the front image, the speed of the attitude change of the HMD 10 is high because, for example, the user turns the head, the target object in the front image is blurred, and it is difficult to estimate and recognize the position and attitude of the target object.

In Step 304, in a case where the position and attitude of the target object were able to be recognized (the target object was able to be tracked) (YES in Step 304), the control unit 1 shifts to next Step 304. In Step 304, the control unit 1 stores the relative position and attitude of the target object with respect to the HMD 10 in the storage unit 2 in association with the time information. Then, the control unit 1 returns to Step 302.

It should be noted that the tracking process of the target object in the front image shown in FIG. 6 is performed for each target object when the target object has been detected in the front image. For example, in a case where two target objects are in the front image and the two target objects have been detected in the front image, two tracking processes in the front image shown in FIG. 6 are performed in parallel. It should be noted that in a case where only one virtual object 9 is AR-displayed, it is unnecessary to perform tracking processes in parallel for each target object.

"Detection Process in Side Image"

Figure 7:
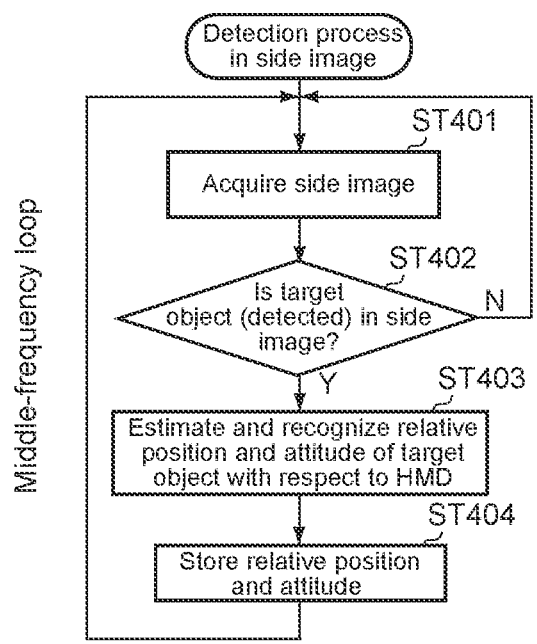
FIG. 7 A flowchart showing a detection process of the target object in a side image.

Next, the detection process of the target object in the side image (second detection process) will be described. FIG. 7 is a flowchart showing the detection process of the target object in the side image.

First of all, the control unit 1 acquires a side image from the side camera 7 (Step 401). Next, the control unit 1 determines whether a target object that is an AR display target for the virtual object 9 is in the side image (whether the target object has been detected) (Step 402).

For the determination as to whether the target object is in the side image, first of all, the control unit 1 extracts a group of feature points from the side image. Next, the control unit 1 compares the group of feature points from the side image extracted with a group of feature points of a cognitive model that is a target object (stored in the storage unit 2 in advance), thereby determining whether the target object is in the side image.

In a case where the target object is not in the side image (in a case where the target object has not been detected) (NO in Step 402), the control unit 1 returns to Step 401 and acquires a side image from the side camera 7 again. On the other hand, in a case where the target object is in the side image (YES in Step 402), the control unit 1 previously estimates and recognizes relative position and attitude of the target object with respect to the HMD 10 on the basis of the group of feature points corresponding to the target object in the side image (Step 403).

Next, the control unit 1 stores the relative position and attitude of the target object with respect to the HMD 10 in the storage unit 2 in association with the time information (Step 404) and returns to Step 401.

It should be noted that in the detection process in the side image shown in FIG. 7 is typically repeatedly performed also after one target object is detected. It is because a plurality of target objects is present in the side image in some cases. It should be noted that in a case where only one virtual object 9 is AR-displayed, when the one target object has been detected, the detection process shown in FIG. 7 may be stopped while this target object can be tracked (see Step 504 in FIG. 8).

"Tracking Process in Side Image"

Figure 8:
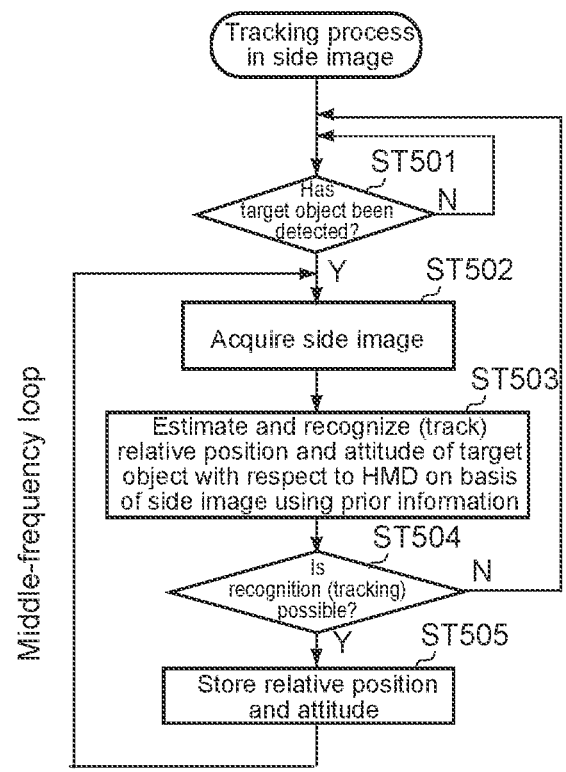
FIG. 8 A flowchart showing a tracking process of the target object in the side image.

Next, the tracking process of the target object in the side image (second tracking process) will be described. FIG. 8 is a flowchart showing the tracking process of the target object in the side image.

First of all, in the detection process of the target object in the side image, the control unit 1 determines whether the target object has been detected (Step 501) (see Step 402 in FIG. 7). In a case where the target object has not been detected (NO in Step 501), the control unit 1 returns to Step 501.

On the other hand, in a case where the target object has been detected (YES in Step 501), the control unit 1 acquires a side image from the side camera 7 (Step 502). Next, using the previous position and attitude (prior information) of the target object with respect to the HMD 10, the control unit 1 previously estimates and recognizes relative position and attitude of the target object with respect to the HMD 10 on the basis of the group of feature points corresponding to the target object in the side image (Step 503).

Next, the control unit 1 determines whether the position and attitude of the target object were able to be recognized (whether the target object was able to be tracked) (Step 504). In a case where the position and attitude of the target object were not able to be recognized (the target object was not able to be tracked) (NO in Step 504), the control unit 1 returns to Step 501.

It should be noted that examples of the case where the position and attitude of the target object were not able to be recognized can include the following cases (1) and (2). (1) The target object departs from the angle-of-view of the side camera 7 and the target object is not shown anymore in the side image. (2) Although the target object is in the side image, the speed of the attitude change of the HMD 10 is high because, for example, the user turns the head, the target object in the side image is blurred, and it is difficult to estimate and recognize the position and attitude of the target object.

In Step 504, in a case where the position and attitude of the target object were able to be estimated (the target object was able to be tracked) (YES in Step 504), the control unit 1 shifts to next Step 504. In Step 504, the control unit 1 stores the relative position and attitude of the target object with respect to the HMD 10 in the storage unit 2 in association with the time information. Then, the control unit 1 returns to Step 502.

It should be noted that the tracking process of the target object in the side image shown in FIG. 8 is performed for each target object when the target object has been detected in the side image. For example, in a case where two target objects are in the side image and the two target objects have been detected in the side image, two tracking processes in the side image shown in FIG. 8 are performed in parallel. It should be noted that in a case where only one virtual object 9 is AR-displayed, it is unnecessary to perform tracking processes in parallel for each target object.

[Frequency of Process Loop]

Next, a frequency of a loop of the four processes of (1) the detection process of the target object in the front image, (2) the tracking process of the target object in the front image, (3) the detection process of the target object in the side image, and (4) the tracking process of the target object in the side image will be described.

In general, the detection process of estimating the position and attitude of the target object without the prior information is larger in amount of computation than the tracking process of estimating the position and attitude of the target object in a situation where the prior information has been provided. Therefore, the frequency of the process loop in the detection process is lower than the frequency of the process loop in the tracking process.

Therefore, the frequency of the loop of (1) the detection process of the target object in the front image is lower than the frequency of the loop of (2) the tracking process of the target object in the front image, and the frequency of the loop of (3) the detection process of the target object in the side image is lower than the frequency of the loop of (4) the tracking process of the target object in the side image.

Moreover, in the present embodiment, for saving power and reducing the amount of computation, the frequency of the loop of (1) the detection process of the target object in the front image is set to be different from the frequency of the loop of (3) the detection process of the target object in the side image. Moreover, the frequency of the loop of (2) the tracking process of the target object in the front image is set to be different from the frequency of the loop of (4) the tracking process of the target object in the side image.

Since it is necessary to AR-display the virtual object 9 in a case where the target object is in the front image, the target object position-and-attitude estimation process based on the front image has a degree of significance. Therefore, (2) the tracking process of the target object in the front image is repeatedly performed at a high frequency (e.g., 100 to 200 times/second) (second frequency). Moreover, the frequency of capturing a front image is repeatedly performed at the high frequency (e.g., 100 to 200 times/second) in accordance with the frequency of the loop of the tracking process.

Moreover, since the detection process is a process that requires an amount of computation larger than in the tracking process, (1) the detection process of the target object in the front image is repeatedly performed at a middle frequency (e.g., 30 to 60 times/second) (fourth frequency).

On the other hand, a result of the target object previously position-and-attitude estimation based on the side image is information that is not used for AR display at that time, but used for the first time, for example, when the user thereafter faces the target object positioned on the side. Therefore, (4) the tracking process of the target object in the side image is repeatedly performed at a middle frequency (e.g., 20 to 40 times/second) (first frequency). Moreover, the frequency of capturing a side image is repeatedly performed at the middle frequency (e.g., 20 to 40 times/second) in accordance with the frequency of the loop of the tracking process.

Moreover, since the detection process is a process that requires an amount of computation larger than in the tracking process, (3) the detection process of the target object in the side image is repeatedly performed at a low frequency (e.g., 5 to 10 times/second) (third frequency). It should be noted that this frequency is such a frequency that detection of the target object on the side is not delayed.

That is, in the present embodiment, the frequency of the loop of (4) the tracking process of the target object in the side image is set to be lower than the frequency of the loop of (2) the tracking process of the target object in the front image. Moreover, in the present embodiment, the frequency of the loop of (3) the detection process of the target object in the side image is set to be lower than the frequency of the loop of (1) the detection process of the target object in the front.

Accordingly, the processing load for the target object previous position-and-attitude estimation process based on the side image is reduced, and it achieves power saving. In particular, in a case where the HMD 10 is operated in a stand-alone manner, it is effective to achieve power saving in this manner.

Here, regarding frequencies of the two loops in (3) the detection process of the target object in the side image and (4) the tracking process of the target object in the side image, the frequency is set to lower as a position (angle) of the side camera with respect to the front becomes further.

[AR Display Process of Virtual Object 9]

Figure 9:
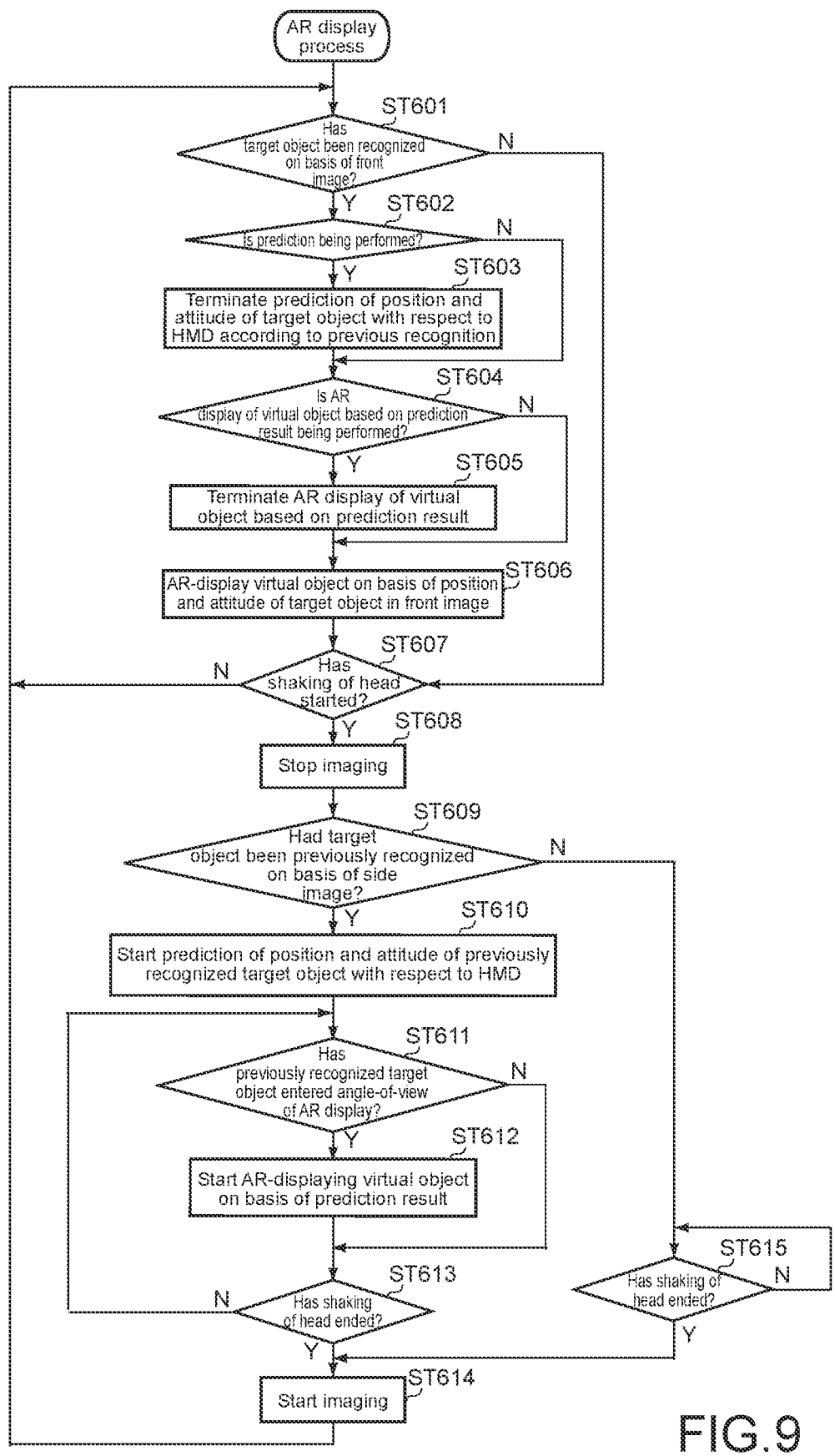
FIG. 9 A flowchart showing an AR display process of the virtual object.

Next, an AR display process of the virtual object 9 will be described. FIG. 9 is a flowchart showing the AR display process of the virtual object 9.

First of all, the control unit 1 determines whether the position and attitude of the target object with respect to the HMD 10 have been recognized on the basis of the front image (see FIGS. 5 and 6). In a case where the position and attitude of the target object with respect to the HMD 10 have been recognized on the basis of the front image (YES in Step 601), the control unit 1 shifts to next Step 602. On the other hand, in a case where the position and attitude of the target object with respect to the HMD 10 have not been recognized on the basis of the front image (NO in Step 601), the control unit 1 skips Steps 602 to 606 and shifts to Step 607.

In Step 602, the control unit 1 determines whether prediction of the position and attitude of the target object with respect to the HMD 10 according to previous recognition is being performed currently. It should be noted that this prediction will be described in detail in Step 610 to be described later.

In a case where the prediction is being performed (YES in Step 602), the control unit 1 terminates the prediction of the position and attitude of the target object with respect to the HMD 10 according to the previous recognition (Step 603) and shifts to next Step 604. On the other hand, in a case where the prediction is not being performed (NO in Step 603), the control unit 1 skips Step 603 and shifts to Step 604.

In Step 604, the control unit 1 determines whether the AR display of the virtual object 9 based on the prediction result is being performed. It should be noted that the AR display of the virtual object 9 based on the prediction result will be described in detail in Step 612 to be described later.

In a case where the AR display of the virtual object 9 based on the prediction result is being performed (YES in Step 604), the control unit 1 terminates the AR display of the virtual object 9 based on the prediction result (Step 605) and shifts to next Step 606. On the other hand, in a case where the AR display of the virtual object 9 based on the prediction result is not being performed (NO in Step 604), the control unit 1 skips Step 605 and shifts to Step 606.

In Step 606, the control unit 1 AR-displays the virtual object 9 with respect to the target object on the basis of the position and attitude of the target object with respect to the HMD 10, which have been recognized on the basis of the front image.

Next, the control unit 1 determines whether the user wearing the HMD 10 has started to shake the head (whether the speed of shaking the head is equal to or larger than a threshold) (Step 607). In this case, the control unit 1 is typically determines the start of the shaking of the head of the user by determining whether the speed of the attitude change of the HMD 10 exceeds a predetermined threshold.

The speed of the attitude change of the HMD 10 may be determined on the basis of the inertial information from the inertial sensor 4 or may be determined on the basis of the value of the localization.

It should be noted that in Step 607, on the basis of the speed of the attitude change of the HMD 10 and the previously recognized position and attitude of the target object, the control unit 1 may predict a speed of the previously recognized target object with respect to the terminal (e.g., around a vertical axis) and determine whether the predicted speed exceeds the threshold. It is because the target object can move in a case where the target object is a person or the like, and such a process can properly cope with the target object that can move.

In a case where the shaking of the head has not been started (NO in Step 607), the control unit 1 returns to Step 101. On the other hand, in a case where the shaking of the head has started (YES in Step 607), the control unit 1 stops imaging by the front camera 6 and the side camera 7 and stops the position-and-attitude recognition process of the target object based on the front image and the previous position-and-attitude recognition process of the target object based on the side image (Step 608).

It is because when the shaking of the head has started, a blur is added to the image, the object to be imaged is blurred, and the position-and-attitude recognition process of the target object based on the front image and the previous position-and-attitude recognition process of the target object based on the side image cannot be properly performed. Therefore, since these processes are not useful, the imaging and these processes are stopped for power saving in the present embodiment. It should be noted that the imaging and these processes may be continued.

After stopping the imaging, the control unit 1 determines whether the target object had been previously recognized at the time of starting to shake the head (or at a time a bit before it) on the basis of the side image (Step 609) (see FIGS. 7 and 8).

In a case where the target object had not been previously recognized (NO in Step 609), the control unit 1 determines whether the shaking of the head has ended (Step 615). Then, in a case where the shaking of the head has ended, the control unit 1 starts imaging by the front camera 6 and the side camera 7 (Step 614).

On the other hand, in a case where the target object had been previously recognized (YES in Step 609), the control unit 1 starts prediction of the position and attitude of the previously recognized target object with respect to the HMD 10 (Step 610). In this prediction, on the basis of the position and attitude of the previously recognized target object with respect to the HMD 10 and the current self position and attitude of the HMD 10, the control unit 1 predicts current relative position and attitude of the target object with respect to the current position and attitude of the HMD 10. It should be noted that in a case where the previously recognized target object has moved, this prediction also includes prediction based on a motion.

Next, on the basis of the prediction result (the current relative position and attitude of the target object with respect to the current position and attitude of the HMD 10), the control unit 1 determines whether the previously recognized target object has entered the angle-of-view of AR display of the display unit 3 (Step 611).

In a case where the previously recognized target object has entered the angle-of-view of AR display of the display unit 3 (YES in Step 611), the control unit 1 starts a process of generating (drawing) an AR image of the virtual object 9 and AR-displaying the virtual object 9 on the basis of the prediction result (Step 612). It should be noted that since the self position and attitude of the HMD 10 can change a bit while the AR image is generated, an AR display position of the virtual object 9 may be corrected on the basis of the latest self position and attitude of the HMD 10.

When starting the AR display of the virtual object 9 based on the prediction result, then the control unit 1 shifts to Step 613. Moreover, in Step 611, in a case where the previously recognized target object has not entered the angle-of-view of AR display of the display unit 3 (NO in Step 611), the control unit 1 skips Step 612 and shifts to Step 613.

In Step 613, the control unit 1 determines whether the user wearing the HMD 10 has ended the shaking of the head (whether the speed of shaking the head is equal to or smaller than the threshold). In this case, the control unit 1 is typically determines that the user has ended the shaking of the head by determining whether the speed of the attitude change of the HMD 10 is equal to or smaller than the predetermined threshold.

The speed of the attitude change of the HMD 10 may be determined on the basis of the inertial information from the inertial sensor 4 or may be determined on the basis of the value of the localization.

It should be noted that in Step 613, on the basis of the speed of the attitude change of the HMD 10 and the previously recognized position and attitude of the target object, the control unit 1 may predict a speed of the previously recognized target object with respect to the terminal (e.g., around a vertical axis) and may determine whether the predicted speed is equal to or smaller than the threshold. It is because in a case where the target object is a person or the like, the target object can move, and such a process can properly cope with the target object that can move.

It should be noted that the process in Step 613 and the process in Step 615 are typically the same.

In Step 613, in a case where the shaking of the head has not ended (NO in Step 613), the control unit 1 returns to Step 611. On the other hand, in Step 613, in a case where the shaking of the head has ended, the control unit 1 starts imaging by the front camera 6 and the side camera 7 (Step 614). Then, the control unit 1 returns to Step 601.

It should be noted that in the present embodiment, the period of prediction is set to be a period from a time at which the shaking of the head of the HMD 10 is detected (from the speed of the attitude change of the HMD 10 becomes equal to or larger than the predetermined threshold) to a time at which the recognition of the previously recognized target object is completed in the recognition process of the target object based on the front image. Moreover, in the present embodiment, a period of AR display of the virtual object 9 based on the prediction is set to be a period from a time at which the previously recognized target object enters the angle-of-view of AR display to a time at which recognition of the target object is completed in the position-and-attitude recognition process of the target object based on the front image.

<Actions, etc.>

Figure 10:
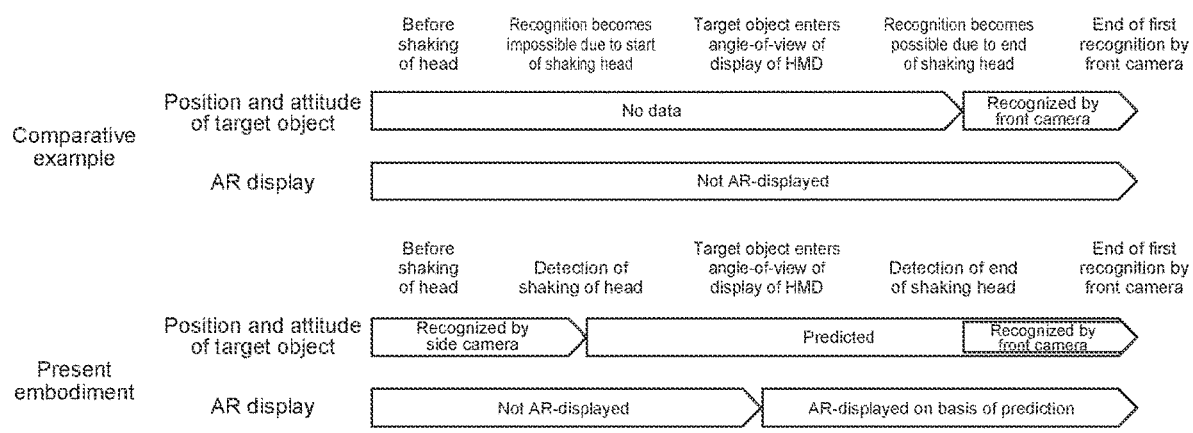
FIG. 10 A diagram in which a flow of processing in the HMD according to the present embodiment is compared to a flow of processing in an HMD according to a comparative example.

Next, actions, etc. in the present embodiment will be described by comparing a flow of processing in the HMD 10 according to the present embodiment with a flow of processing in an HMD 20 according to a comparative example. FIG. 10 is a diagram comparing the flow of processing in the HMD 10 according to the present embodiment with the flow of processing in the HMD 20 according to the comparative example.

Figure 11:
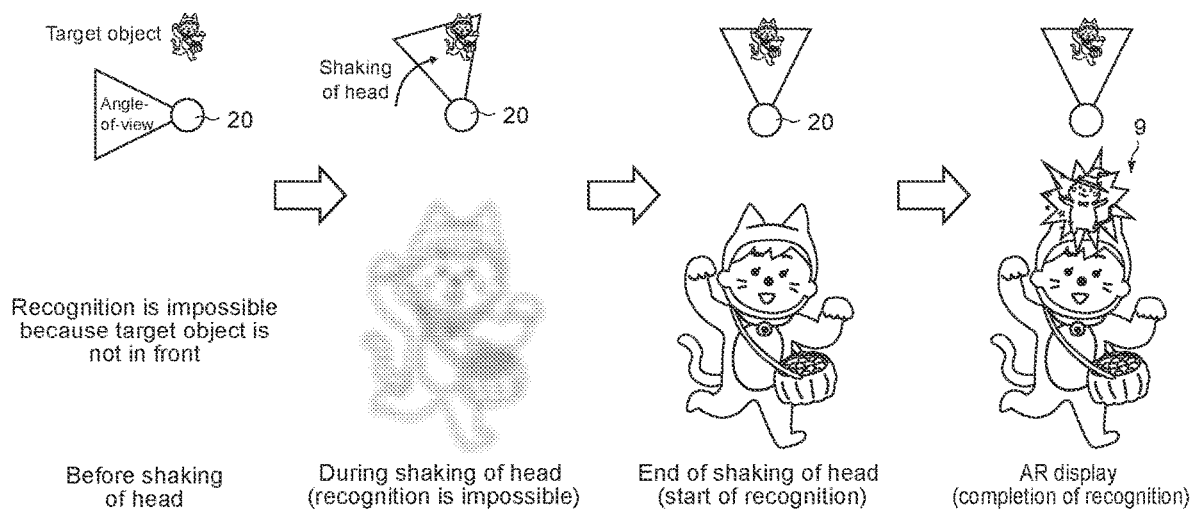
FIG. 11 A diagram showing which timing the virtual object is AR-displayed when the user turns the head in the HMD according to the comparative example.
Figure 12:
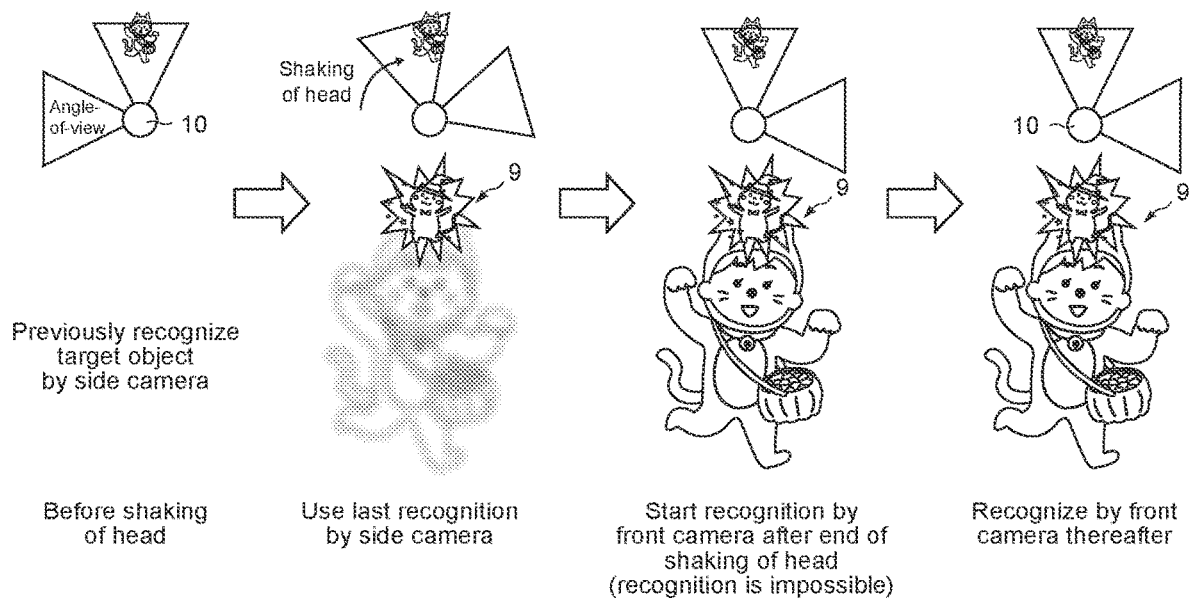
FIG. 12 A diagram showing which timing the virtual object is AR-displayed when the user turns the head in the HMD according to the present embodiment.

FIG. 11 is a diagram showing which timing the virtual object 9 is AR-displayed when the user turns the head in the HMD 20 according to the comparative example. FIG. 12 is a diagram showing which timing the virtual object 9 is AR-displayed when the user turns the head in the HMD 10 according to the present embodiment.

First of all, the flow of processing in the HMD 20 according to the comparative example will be described with reference to the upper part of FIG. 10 and FIG. 11.

In the HMD 20 according to the comparative example, the side camera 7 is not provided. Therefore, the target object cannot be previously recognized before the shaking of the head. When the target object enters the angle-of-view of AR display by the user shaking the head, a blur is added to the front image and the target object is blurred due to the shaking of the head. For this reason, at a time at which the target object enters the angle-of-view of AR display, the position and attitude of the target object with respect to the HMD 10 cannot be recognized on the basis of the front image, and AR display based on this recognition cannot also be performed.

When the speed of shaking the head decreases so that the position and attitude of the target object with respect to the HMD 10 can be recognized on the basis of the front image, recognition of the target object is started. Then, in a case where the recognition of the position and attitude of the target object with respect to the HMD 10 is completed, the AR image of the virtual object 9 is generated (drawn) and the virtual object 9 is AR-displayed.

That is, in view of the user, the virtual object 9 not AR-displayed is suddenly AR-displayed with respect to the target object. In such a case, the user is likely to feel strange, discomfort, or the like.

Next, the flow of processing in the HMD 10 according to the present embodiment will be described with reference to the lower part of FIG. 10 and FIG. 12.

In the HMD 10 according to the present embodiment, the side camera 7 is provided. Therefore, the target object can be previously recognized before the shaking of the head (see FIGS. 7 and 8). When the start of the shaking of the head of the user has been detected (see YES in Step 607 of FIG. 9), prediction of the position and attitude of the previously recognized target object with respect to the HMD 10 is started (see Step 610).

When the target object enters the angle-of-view of AR display (see Step 611), the AR display of the virtual object 9 based on the prediction result is started (see Step 612). When the speed of shaking the head decreases (see YES in Step 613) so that the position and attitude of the target object with respect to the HMD 10 can be recognized on the basis of the front image, recognition of the target object based on the front image is started. Then, in a case where first recognition of the position and attitude of the target object with respect to the HMD 10 based on the front image (i.e., a detection process of the target object based on the front image) is completed (see YES in Step 601), the virtual object 9 is AR-displayed on the basis of not prediction, but recognition of the position and attitude of the target object using the front image (see Step 606).

As described above, in the present embodiment, the previous recognition process of previously recognizing the position and attitude of the target object outside the angle-of-view of AR display with respect to the HMD 10 on the basis of the side image from the side camera 7 capable of imaging the region outside the angle-of-view of AR display is performed, and when the target object enters the angle-of-view of AR display, the virtual object 9 is AR-displayed with respect to the target object on the basis of the previously recognized position and attitude of the target object.

Accordingly, when the target object enters the angle-of-view of AR display, the virtual object 9 can be AR-displayed without delay. Therefore, the virtual object 9 not AR-displayed is not suddenly AR-displayed with respect to the target object, and it is possible to prevent the user from feeling strange, discomfort, or the like.

Moreover, in the present embodiment, the position and attitude of the target object is predicted on the basis of the previously recognized position and attitude of the target object and the estimated self position and attitude of the HMD 10, and when the target object enters the angle-of-view of AR display, the virtual object 9 is AR-displayed with respect to the target object on the basis of the prediction result.

Since the target object is AR-displayed on the basis of such prediction, the virtual object 9 can be properly AR-displayed without delay when the target object enters the angle-of-view of AR display.

Moreover, in the present embodiment, the frequency of the loop of (4) the tracking process of the target object in the side image is set to be lower than the frequency of the loop of (2) the tracking process of the target object in the front image. Moreover, in the present embodiment, the frequency of the loop of (3) the detection process of the target object in the side image is set to be lower than the frequency of the loop of (1) the detection process of the target object in the front.

Accordingly, the processing load for the target object previous position-and-attitude estimation process based on the side image is reduced, and it achieves power saving. In particular, in a case where the HMD 10 is operated in a stand-alone manner, it is effective to achieve power saving in this manner.

<<Various Modified Examples>>
<Exposure Timing of Front Camera 6>

Next, an exposure timing of the front camera 6 will be described. Referring to FIG. 9, when the speed of shaking the head decreases to a certain degree, the control unit 1 starts the stopped imaging of the front camera 6 (see Step 614). By adjusting the exposure timing of the front camera 6 at this time, the completion of the first recognition of the position and attitude of the target object with respect to the HMD 10 based on the front image (see Step 601) may be made earlier.

Here, it is provided that when the speed of shaking the head decreases and the exposure of the front camera 6 is started, the exposure start timing is a bit earlier. In this case, although the target object can be recognized in a later part of the front image, a blur is added to an earlier part of the front image and there is a possibility that the target object cannot be recognized as a whole of the image. In this case, depending on a timing at which the exposure of the front image starts, the recognition can be completed, delayed by at most one frame. It results in delay of the detection process of the target object based on the front image, which is relatively accurate.

An ideal start timing of the exposure of the front camera 6 is a timing immediately after the speed of shaking the head (the speed of the attitude change of the HMD 10) becomes speed that can perform the detection process of the target object based on the front image. It can be achieved by determining a threshold on the basis of an exposure time and the inertial information (or the attitude change based on the localization).

That is, the control unit 1 may determine (adjust) the exposure start timing on the basis of the speed of the attitude change of the HMD 10.

It should be noted that in a case where the target object is a person or the like, the target object can move. In this case, considering not only the speed of shaking the head (the speed of the attitude change of the HMD 10) but also the motion of the target object, it is necessary to predict relative speed of the target object with respect to the HMD 10.

Therefore, in this case, the control unit 1 may predict a speed of the target object with respect to the terminal on the basis of the speed of the attitude change of the HMD 10 and the previously recognized position and attitude of the target object and determine (adjust) the exposure timing of the front image on the basis of the predicted speed.

<Exposure Time of Front Camera 6>

Next, the exposure time of the front camera 6 will be described. Referring to FIG. 9, when the speed of shaking the head decreases to a certain degree, the control unit 1 starts the stopped imaging of the front camera 6 (see Step 614). By adjusting the exposure time of the front camera 6 at this time, the completion of the first recognition of the position and attitude of the target object with respect to the HMD 10 based on the front image (see Step 601) may be made earlier.

Here, in a case where imaging by the front camera 6 is performed after the speed of shaking the head decreases, the detection process of the target object based on the front image (i.e., the first recognition) can be earlier by temporarily reducing the exposure time. However, when the exposure time is reduced, the image can be darker or noise can be added for improving the sensitivity, which may lower the recognition accuracy. Therefore, when it is detected that the target object can be recognized even with a normal exposure time after the speed of shaking the head further decreases, the exposure time may be returned to the normal exposure time.

That is, the control unit 1 may determine (adjust) the exposure time on the basis of the speed of the attitude change of the HMD 10.

It should be noted that in a case where the target object is a person or the like, the target object can move. In this case, it is necessary to predict relative speed of the target object with respect to the HMD 10, considering not only the speed of shaking the head (the speed of the attitude change of the HMD 10), but also the motion of the target object. Therefore, in this case, the control unit 1 may predict a speed of the target object with respect to the terminal on the basis of the speed of the attitude change of the HMD 10 and the previously recognized position and attitude of the target object and determine (adjust) the exposure time of the front image on the basis of the predicted speed.

<Relationship between Angle-of-View of AR display of Display Unit 3 and Camera Angle-of-View>

Here, in a case where an angle-of-view of imaging of a single camera can cover the angle-of-view of AR display of the display unit 3, such a camera may be used as the front camera 6. On the other hand, in a case where an angle-of-view of imaging of a single camera cannot cover the angle-of-view of AR display, a plurality of cameras are used as front cameras 6. In this case, the plurality of front cameras 6 is arranged so that their angle-of-views of imaging partially overlap each other.

In this case, it is unnecessary to perform the tracking process on an image of images of the plurality of front cameras 6, in which the target object is not shown, and it is sufficient to perform only the detection process on such an image. In this case, regarding a movement of the target object between the plurality of front cameras 6, it is sufficient to perform AR display based on the above-mentioned prediction and the above-mentioned prediction result until recognition in a detection process by a camera at a destination of the movement is completed like a movement of the target object between the front camera 6 and the side camera 7. It should be noted that as an area in which the angle-of-views of the front cameras 6 overlap each other increases, the time of using the prediction decreases.

Figure 13:
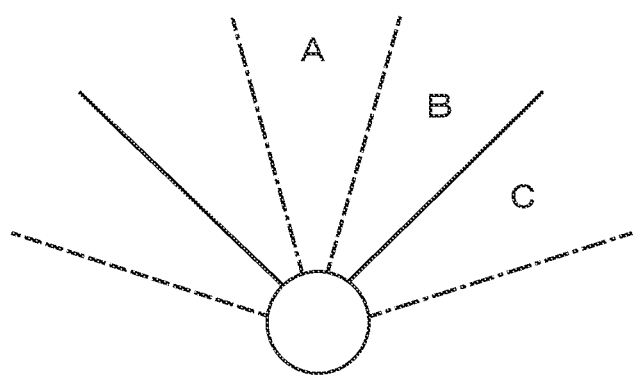
FIG. 13 A diagram showing a status in a case where a plurality of front cameras 6 is used.

FIG. 13 is a diagram showing a status in a case where the plurality of front cameras 6 is used.

These front cameras 6 are each configured to be capable of imaging the region corresponding to the angle-of-view of AR display of the display unit 3 and configured to be capable of imaging the region outside the angle-of-view of AR display of the display unit 3. That is, the front cameras 6 in this example are the second imaging unit and also the first imaging unit. It should be noted that in the description of FIG. 13, the front camera 6 on the right-hand side will be referred to as a first front camera 6 and the front camera 6 on the left-hand side will be referred to as a second front camera 6.

In the example of FIG. 13, in a case where the front cameras 6 are capable of imaging both the inside of the angle-of-view of AR display and the outside of the angle-of-view of AR display, the frequency of the tracking process is set to differ depending on whether the target object is present inside or outside the angle-of-view of AR display for power saving.

Hereinafter, assuming cases where the target object is present in (A) to (C), each of the cases will be described. It should be noted that as to the detection process, the control unit 1 performs the detection process at the middle frequency on the basis of images from the first front camera 6 and the second front camera 6 irrespective of which position of (A) to (C) the target object is present, considering that a new target object will newly appear inside the angle-of-view of AR display.

In a case of (A), i.e., a case where the target object is present inside both the angle-of-views of imaging of the first front camera 6 and the second front camera 6 will be considered. In this case, since the target object is present inside both the angle-of-views of imaging of the first front camera 6 and the second front camera 6, it is sufficient that the control unit 1 performs the tracking process at the high frequency on the basis of an image from one front camera 6.

In a case of (B), i.e., a case where the target object is present inside the angle-of-view of imaging of the first front camera 6, outside the angle-of-view of imaging of the second front camera 6, and inside the angle-of-view of AR display will be considered. In this case, the control unit 1 performs the tracking process at the high frequency on the basis of image information from the first front camera 6.

In a case of (C), i.e., a case where the target object is present inside the angle-of-view of imaging of the first front camera 6, outside the angle-of-view of imaging of the second front camera 6, and outside the angle-of-view of AR display will be considered. In this case, since the target object is not present inside the angle-of-view of AR display, the control unit 1 recognizes the position and attitude of the target object in advance in order to cope with shaking of the head. Therefore, it is sufficient that the control unit 1 performs the tracking process at the middle frequency.

That is, in this example, the first front cameras 6 are capable of imaging both regions of the region (C) outside the angle-of-view of AR display and the regions (A) and (B) corresponding to the angle-of-view of AR display.

Then, the control unit 1 performs a process of previously recognizing position and attitude of the target object with respect to the HMD 10 on the basis of image information of the image from the first front camera 6, which relates to the region (C) outside the angle-of-view of AR display. Moreover, the control unit 1 performs a process of recognizing position and attitude of the target object with respect to the HMD 10 on the basis of image information of the image from the first front camera 6, which relates to the regions (A) and (B) corresponding to the angle-of-view of AR display.

Moreover, in the previous position-and-attitude recognition process, the control unit 1 repeatedly performs a tracking process (third tracking process) of tracking the motion of the target object on the basis of the image information of the region outside the angle-of-view of AR display at the middle frequency (fifth frequency).

Moreover, in the position-and-attitude recognition process, the control unit 1 repeatedly performs a tracking process (fourth tracking process) of tracking the motion of the target object on the basis of the image information of the region corresponding to the angle-of-view of AR display at a high frequency (sixth frequency) higher than the middle frequency.

Such processes can properly achieve power saving.

<Dedicated Camera>

Whether a dedicated camera is installed in the HMD 10 for the present technology will be described. Although the dedicated camera can also be installed for the present technology, a camera already installed in the existing HMD 10 may be used. In general, the HMD 10 often has cameras not only in the front but also on the side for estimation of self position and attitude (SLAM). Therefore, the cameras used for the estimation of self position and attitude may be used for the present technology. A main stream is a type that estimates a self position by processing a captured image at the middle frequency in localization and improves the rate of the localization itself by correcting this self position on the basis of the inertial information. Therefore, it works well with the present technology. As for the front camera 6, increasing the frequency of imaging of a front camera used for the conventional localization is assumed (because the middle frequency is employed in SLAM and the high frequency is employed in the present technology).

<Reprojection>

A relation between the present technology and a reprojection technology will be described. Although both are similar in that they use localization based on inertial information, the present technology and the reprojection are different in the following point. The reprojection is an image modification technology of modifying an image rendered once with a recognition result of later localization.

On the other hand, the present technology is an object recognition technology in which a target object located in an area other than the front is recognized by the side camera 7 in advance and then coordinates of the target object are tracked by localization, thereby preventing AR display from being delayed even in a case of shaking of the head.

The present technology may be used with the reprojection because these technologies are independent. The reprojection can improve the frame rate by reducing a delay while reducing misalignment after recognizing and rendering an object. However, since an object, which has not been recognized yet, cannot be recognized and AR-displayed, there is a period in which even a target object located in the front cannot be AR-displayed. In view of this, using both the present technology and the reprojection can solve this problem.

<Supplements>

Hereinabove, the HMD 10 has been described as an example of the terminal. On the other hand, the terminal is not limited to the HMD 10. The terminal may be, for example, a wearable device that is attachable to the user's body or may be a mobile device portable to the user.

Examples of the wearable device can include wristband-type, watch-type, ring-type, and pendant-type wearable devices other than the HMD 10. Examples of the mobile device can include a mobile phone (including a smartphone), a tablet personal computer (PC), a portable game console, and a portable music player.

Typically, any apparatus can be employed as the terminal apparatus 20 as long as the apparatus can satisfy three conditions: to be capable of performing AR display; to be capable of estimating self position and attitude in the real space; and to be movable along with a movement of the user.

Moreover, the HMD 10 has been described hereinabove as an example of the information processing apparatus. That is, the case where the information processing apparatus is the terminal itself has been described. On the other hand, the information processing apparatus does not need to be the terminal itself. Typically, an apparatus including the control unit 1 that performs the above-mentioned various processes can be considered as the information processing apparatus. Therefore, the information processing apparatus may be the server device in the network or the like.

The present technology can also take the following configurations.

(1) An information processing apparatus, including
a control unit that performs a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal, and AR-displays, when the target object enters the angle-of-view of AR display, a virtual object with respect to the target object on the basis of the previously recognized position and attitude of the target object.

(2) The information processing apparatus according to (1), in which
the control unit predicts position and attitude of the target object on the basis of the previously recognized position and attitude of the target object and estimated self position and attitude of the terminal, and when the target object enters the angle-of-view of AR display, AR-displays a virtual object with respect to the target object on the basis of a result of the prediction.

(3) The information processing apparatus according to (2), in which
the control unit performs, on the basis of second image information from a second imaging unit of the terminal that is capable of imaging a region corresponding to the angle-of-view of AR display, a recognition process of recognizing position and attitude of the target object inside the angle-of-view of AR display, and AR-displays the virtual object with respect to the target object on the basis of the recognized position and attitude of the target object.

(4) The information processing apparatus according to (3), in which
the control unit AR-displays the virtual object based on a result of the prediction in a period from a time at which the target object enters the angle-of-view of AR display to a time at which recognition of the target object in the recognition process is completed.

(5) The information processing apparatus according to (3) or (4), in which
the control unit performs the prediction in a period from a time at which a speed of an attitude change of the terminal becomes equal to or larger than a predetermined threshold to a time at which recognition of the target object in the recognition process is completed.

(6) The information processing apparatus according to any one of (3) to (5), in which
the control unit repeatedly performs, in the previous recognition process, a first detection process of detecting the target object at a first frequency on the basis of the first image information.

(7) The information processing apparatus according to (6), in which
the control unit repeatedly performs, in the recognition process, a second detection process of detecting the target object at a second frequency different from the first frequency on the basis of the second image information.

(8) The information processing apparatus according to (7), in which
the first frequency is lower than the second frequency.

(9) The information processing apparatus according to any one of (3) to (8), in which
the control unit repeatedly performs, in the previous recognition process, a first tracking process of tracking a motion of the target object at a third frequency on the basis of the first image information.

(10) The information processing apparatus according to (9), in which
the control unit repeatedly performs, in the recognition process, a second tracking process of tracking a motion of the target object on the basis of the second image information at a fourth frequency different from the third frequency.

(11) The information processing apparatus according to (10), in which
the third frequency is lower than the fourth frequency.

(12) The information processing apparatus according to any one of (3) to (11), in which
the control unit adjusts an exposure timing of the second imaging unit on the basis of a speed of an attitude change of the terminal.

(13) The information processing apparatus according to (12), in which
the control unit predicts a speed of the target object with respect to the terminal on the basis of the speed of the attitude change of the terminal and the previously recognized position and attitude of the target object and adjusts the exposure timing of the second imaging unit on the basis of the predicted speed.

(14) The information processing apparatus according to any one of (3) to (13), in which
the control unit adjusts an exposure time of the second imaging unit on the basis of a speed of an attitude change of the terminal.

(15) The information processing apparatus according to (14), in which
the control unit predicts a speed of the target object with respect to the terminal on the basis of the speed of the attitude change of the terminal and the previously recognized position and attitude of the target object and adjusts the exposure timing of the second imaging unit on the basis of the predicted speed.

(16) The information processing apparatus according to (2), in which
the first imaging unit is capable of imaging both regions of a region outside the angle-of-view of AR display and a region corresponding to the angle-of-view of AR display, and the control unit performs the previous recognition process on the basis of image information of the region outside the angle-of-view of AR display of the first image information and performs a recognition process of recognizing position and attitude of the target object inside the angle-of-view of AR display on the basis of image information of the region corresponding to the angle-of-view of AR display of the first image information.

(17) The information processing apparatus according to (16), in which
the control unit repeatedly performs, in the previous recognition process, a third tracking process of tracking a motion of the target object at a fifth frequency on the basis of the image information of the region outside the angle-of-view of AR display.

(18) The information processing apparatus according to (17), in which
the control unit repeatedly performs, in the recognition process, a fourth tracking process of tracking a motion of the target object on the basis of the image information of the region corresponding to the angle-of-view of AR display at a sixth frequency different from the fifth frequency.

(19) An information processing method, including:
performing a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal; and
AR-displaying, when the target object enters the angle-of-view of AR display, a virtual object with respect to the target object on the basis of the previously recognized position and attitude of the target object.

(20) A program that causes a computer to execute processing including:
performing a previous recognition process of previously recognizing, on the basis of first image information from a first imaging unit of a terminal that is capable of imaging a region outside an angle-of-view of AR display of a display unit of the terminal, position and attitude of a target object outside the angle-of-view of AR display with respect to the terminal; and
AR-displaying, when the target object enters the angle-of-view of AR display, a virtual object with respect to the target object on the basis of the previously recognized position and attitude of the target object.

REFERENCE SIGNS LIST

1 control unit
2 storage unit
3 display unit
4 inertial sensor
5 imaging unit
6 front camera
7 side camera
10 HMD

The invention claimed is:

1. An information processing apparatus, comprising:
a control unit configured to execute a previous recognition process which includes a previous recognition, based on a first image information from a first imaging unit of a terminal that images a region outside an angle-of-view of AR display of a display unit of the terminal, of a first position and a first attitude of a target object outside the angle-of-view of AR display with respect to the terminal, and
the display unit configured to AR-display, when the target object enters the angle-of-view of AR display, a virtual object with respect to the target object based on the previously recognized first position and the first attitude of the target object.

2. The information processing apparatus according to claim 1, wherein the control unit is further configured to:
predict a second position and a second attitude of the target object based on
the previously recognized first position and the first attitude of the target object, and
estimated self position and attitude of the terminal, wherein when the target object enters the angle-of-view of AR display, the display unit is further configured to AR-display the virtual object with respect to the target object based on a basis of a result of the prediction.

3. The information processing apparatus according to claim 2, wherein
the control unit is further configured to execute, based on a second image information from a second imaging unit of the terminal that images a region corresponding to the angle-of-view of AR display, a specific recognition process which includes recognition of a third position and a third attitude of the target object inside the angle-of-view of AR display, and
the display unit is further configured to AR-display the virtual object with respect to the target object based on the recognized third position and the third attitude of the target object.

4. The information processing apparatus according to claim 3, wherein the display unit is further configured to AR-display the virtual object based on the result of the prediction in a period from a first time at which the target object enters the angle-of-view of AR display to a second time at which recognition of the target object in the specific recognition process is completed.

5. The information processing apparatus according to claim 3, wherein the control unit is further configured to execute the prediction in a period from a first time at which a first speed of an attitude change of the terminal becomes at least one of equal to or larger than a specific threshold to a second time at which recognition of the target object in the specific recognition process is completed.

6. The information processing apparatus according to claim 3, wherein the control unit is further configured to repeatedly execute, in the previous recognition process, a first detection process which includes detection of the target object at a first frequency based on the first image information.

7. The information processing apparatus according to claim 6, wherein the control unit is further configured to repeatedly execute, in the specific recognition process, a second detection process which includes detection of the target object at a second frequency different from the first frequency based on the second image information.

8. The information processing apparatus according to claim 7, wherein the first frequency is lower than the second frequency.

9. The information processing apparatus according to claim 3, wherein the control unit is further configured to repeatedly execute, in the previous recognition process, a first tracking process of tracking a motion of the target object at a third frequency based on the first image information.

10. The information processing apparatus according to claim 9, wherein the control unit is further configured to repeatedly execute, in the specific recognition process, a second tracking process of tracking a motion of the target object based on the second image information at a fourth frequency different from the third frequency.

11. The information processing apparatus according to claim 10, wherein the third frequency is lower than the fourth frequency.

12. The information processing apparatus according to claim 3, wherein the control unit is further configured to adjust an exposure timing of the second imaging unit based on a first speed of an attitude change of the terminal.

13. The information processing apparatus according to claim 12, wherein the control unit is further configured to:
predict a second speed of the target object with respect to the terminal based on the first speed of the attitude change of the terminal and the previously recognized first position and the first attitude of the target object, and
adjust the exposure timing of the second imaging unit based on the predicted second speed.

14. The information processing apparatus according to claim 3, wherein the control unit is further configured to adjust an exposure time of the second imaging unit based on a first speed of an attitude change of the terminal.

15. The information processing apparatus according to claim 14, wherein the control unit is further configured to:
predict a second speed of the target object with respect to the terminal based on the first speed of the attitude change of the terminal and the previously recognized first position and the first attitude of the target object, and
adjust the exposure time of the second imaging unit based on the predicted second speed.

16. The information processing apparatus according to claim 3, wherein
the first imaging unit is further configured to image both the region outside the angle-of-view of AR display and the region corresponding to the angle-of-view of AR display, and
the control unit is further configured to:
execute the previous recognition process based on the first image information related to the region outside the angle-of-view of AR display, and
execute the specific recognition process of recognizing the third position and the third attitude of the target object inside the angle-of-view of AR display based on the second image information related to the region corresponding to the angle-of-view of AR display.

17. The information processing apparatus according to claim 16, wherein the control unit is further configured to repeatedly execute, in the previous recognition process, a third tracking process of tracking a motion of the target object at a fifth frequency based on the first image information of the region outside the angle-of-view of AR display.

18. The information processing apparatus according to claim 17, wherein the control unit is further configured to repeatedly execute, in the specific recognition process, a fourth tracking process of tracking a motion of the target object based on the second image information of the region corresponding to the angle-of-view of AR display at a sixth frequency different from the fifth frequency.

19. An information processing method, comprising:
executing a previous recognition process which includes a previous recognition, based on first image information from a first imaging unit of a terminal that images a region outside an angle-of-view of AR display of a display unit of the terminal, of a first position and a first attitude of a target object outside the angle-of-view of AR display with respect to the terminal; and
AR-displaying, when the target object enters the angle-of-view of AR display, a virtual object with respect to the target object based on the previously recognized first position and the first attitude of the target object.

20. A non-transitory computer-readable medium having stored thereon, computer-executable instructions which, when executed by a computer, cause the computer to execute operations, the operations comprising:
executing a previous recognition process which includes a previous recognition, based on first image information from a first imaging unit of a terminal that images a region outside an angle-of-view of AR display of a display unit of the terminal, of a first position and a first attitude of a target object outside the angle-of-view of AR display with respect to the terminal; and
AR-displaying, when the target object enters the angle-of-view of AR display, a virtual object with respect to the target object based on the previously recognized first position and the first attitude of the target object.

* * * * *